(12) United States Patent
Folken et al.

(10) Patent No.: US 7,619,324 B2
(45) Date of Patent: Nov. 17, 2009

(54) POWER SYSTEM WITH MULTIPLE GENERATOR SETS

(75) Inventors: Keith Ronald Folken, West Peoria, IL (US); Michael Allen Dvorsky, Peoria, IL (US); Julie Lynn Boley, Peoria, IL (US); James Dean McBurney, Metamora, IL (US); Andrew William Black, Peoria, IL (US); David Lee Zwetz, II, Morton, IL (US); Stephen Charles Nofsinger, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 299 days.

(21) Appl. No.: 11/698,999

(22) Filed: Jan. 29, 2007

(65) Prior Publication Data

US 2008/0179959 A1 Jul. 31, 2008

(51) Int. Cl.
*H02J 9/00* (2006.01)
(52) U.S. Cl. ............................ 307/84; 307/85
(58) Field of Classification Search ............. 307/64, 307/85, 84
See application file for complete search history.

(56) References Cited

U.S. PATENT DOCUMENTS

| | | | |
|---|---|---|---|
| 3,646,356 A | 2/1972 | Hoffman | |
| 4,069,424 A | 1/1978 | Burkett | |
| 4,118,635 A | 10/1978 | Barrett et al. | |
| 4,349,744 A | 9/1982 | Reuther et al. | |
| 4,536,126 A | 8/1985 | Reuther | |
| 4,886,981 A | 12/1989 | Lentini et al. | |
| 4,937,463 A | 6/1990 | Kobayashi et al. | |
| 4,965,463 A | 10/1990 | Maruyama et al. | |
| 6,639,331 B2 * | 10/2003 | Schultz | 307/84 |
| 2003/0102716 A1 | 6/2003 | Schultz | |
| 2008/0080104 A1 * | 4/2008 | Yagudayev et al. | 361/20 |

FOREIGN PATENT DOCUMENTS

WO 2004/073137 8/2004

* cited by examiner

*Primary Examiner*—Robert L. Deberadinis
(74) *Attorney, Agent, or Firm*—Finnegan, Henderson, Farabow, Garrett & Dunner

(57) ABSTRACT

A method of operating a power system is provided. The power system may have a plurality of generator sets and a power line. The method may include commanding a plurality of the generator sets that are disconnected from the power line to start generating electricity. The method may also include supplying to a control device acting as a coordinating control unit information about the operating state of each of the plurality of generator sets commanded to start generating electricity. Additionally, the method may include determining with the coordinating control unit which of the plurality of generator sets has become ready to supply electricity to the power line first. The method may also include initiating supply of electricity to the power line by first connecting to the power line the generator set that the coordinating control unit has determined to be the first ready to supply electricity.

20 Claims, 5 Drawing Sheets

POWER SYSTEM WITH MULTIPLE GENERATOR SETS

TECHNICAL FIELD

The present disclosure relates to power systems with electric power loads and, more particularly, to power systems with multiple generator sets for supplying electricity to electric power loads.

BACKGROUND

Many power systems have multiple generator sets for supplying electricity to electric power loads. Some such power systems may have a group of generator sets that can all connect with and supply power to a common power line. In some circumstances, such a power system may have all of the generator sets in the group shut down and disconnected from the common power line with no electricity flowing in the common power line. In such circumstances, various events may warrant initiating supply of electricity from one or more of the generator sets in the group to the common power line. Some methods of doing so have one particular generator set designated to always connect to the common power line first. Such a control method may unnecessarily delay supply of electricity to the common power line because a generator set that becomes ready to supply electricity before the generator designated to connect first must wait for the designated generator set to become ready and connect.

U.S. Pat. No. 6,639,331 to Schultz ("the '331 patent") discloses a power system with a plurality of generator sets associated with a common power line and a control method wherein any generator set that has become ready to supply electricity can connect to the common power line first if it wins an arbitration with the other generator sets. In the control method of the '331 patent after at least one generator set has become ready to supply electricity to the common power line, the generator sets collectively execute an arbitration to determine which generator set will connect to the common power line first. In this arbitration, each generator set ready to supply electricity repeatedly executes a cycle that includes sending an inhibiting signal to other generator sets for a period and then waiting for a period. A generator set drops out of the arbitration only if it is not sending an inhibiting signal when another generator set sends it an inhibiting signal. Any generator set that executes 100 cycles of signaling and waiting without dropping out of the arbitration proceeds to connect to the common power line.

Although the control method of the '331 patent allows any generator set that has become ready to supply electricity to connect to the electrical conductor first if it wins an arbitration, certain disadvantages persist. For example, after determining that a generator set has become ready to supply electricity, waiting for signals from other generator sets may unnecessarily delay supply of electricity to the common power line.

The power system and methods of the present disclosure solve one or more of the problems set forth above.

SUMMARY OF THE INVENTION

One disclosed embodiment relates to a method of operating a power system, the power system having a plurality of generator sets and a power line. The method may include commanding a plurality of the generator sets that are disconnected from the power line to start generating electricity. The method may also include supplying to a control device acting as a coordinating control unit information about the operating state of each of the plurality of generator sets commanded to start generating electricity. Additionally, the method may include determining with the coordinating control unit which of the plurality of generator sets has become ready to supply electricity to the power line first. The method may also include initiating supply of electricity to the power line by first connecting to the power line the generator set that the coordinating control unit has determined to be the first ready to supply electricity.

Another embodiment relates to a method of operating a power system, the power system having a power line and a plurality of generator sets. The method may include, with the plurality of generator sets disconnected from the power line, commanding a plurality of the generator sets to start generating electricity. The method may also include, in response to each generator set becoming ready to supply electricity, generating a signal that indicates the readiness of the generator set to a control device acting as a coordinating control unit. Additionally, the method may include operating the coordinating control unit to control which of the generator sets commanded to start generating electricity will first connect to the power line. This may include, in response to the first signal indicating the readiness of a generator set, providing the generator set associated with the first signal authorization from the coordinating control unit to connect to the power line.

A further embodiment relates to a power system that includes a power line, a plurality of generator sets operable to supply electricity to the electric power load, and a control network that includes a plurality of control devices. The control network may be configured to operate with one of the control devices acting as a coordinating control unit to coordinate one or more aspects of the operation of the plurality of generator sets. The control network may also be configured to selectively change which of the plurality of control devices acts as the coordinating control unit.

DETAILED DESCRIPTION

Figure 1:
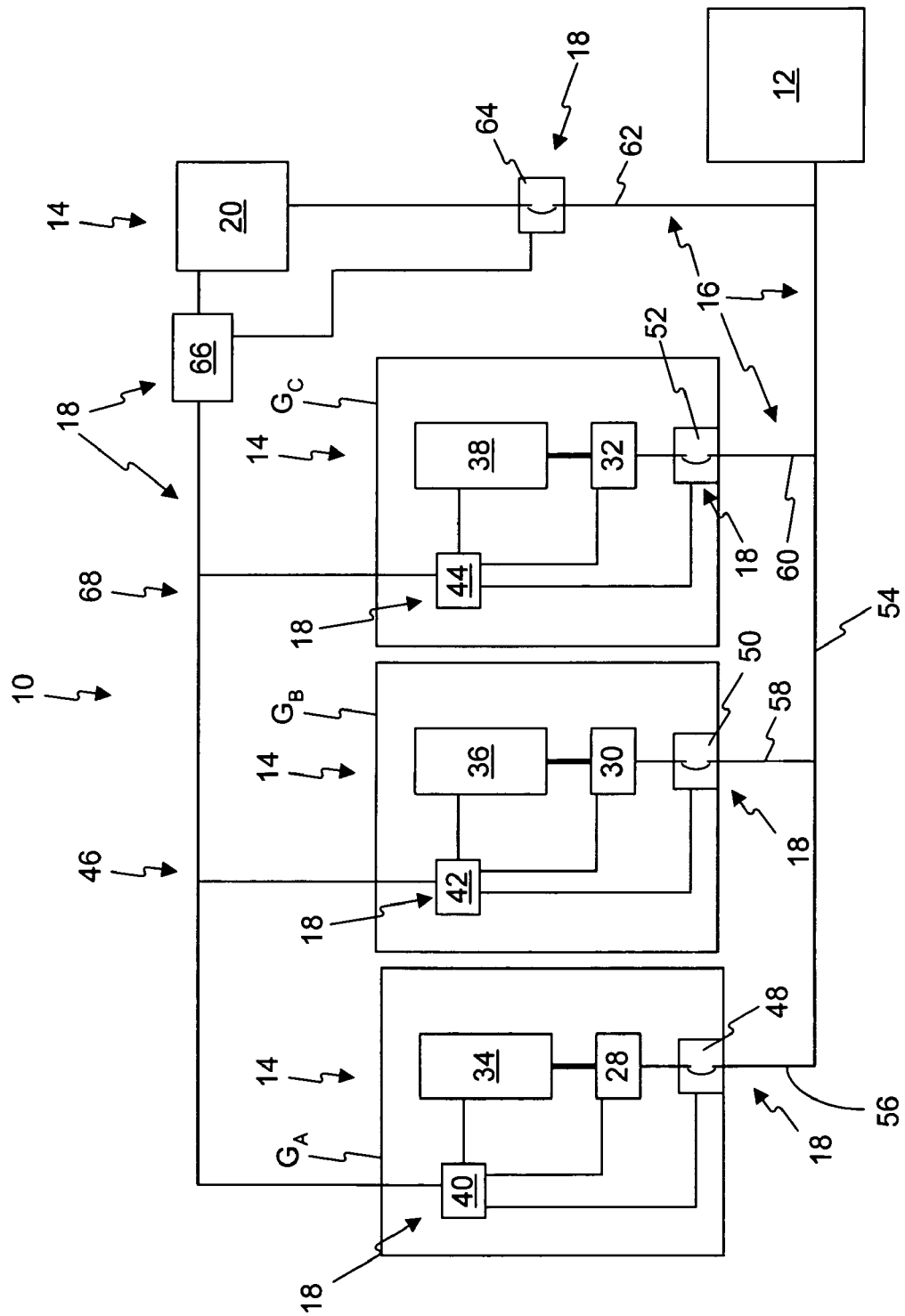
FIG. 1 is a schematic illustration of one embodiment of a power system according to the present disclosure.

FIG. 1 illustrates a power system 10 according to the present disclosure. Power system 10 may include an electric power load 12, power sources 14 operable to supply electricity, a power-transmission network 16 for transferring electricity from power sources 14 to electric power load 12, and power-system controls 18.

Electric power load 12 may include any device or devices that require electricity to perform one or more tasks, including, but not limited to, electric lights and electric motors. In some embodiments, electric power load 12 may require electric power in a particular form, such as three-phase alternating current.

Power sources 14 may include an electric utility 20, and generator sets $G_A$, $G_B$, $G_C$. Electric utility 20 may be, for example, an electricity generation and distribution system that supplies electricity to multiple customers for fee. Electric utility 20 may supply alternating electric current, such as three-phase alternating current with a frequency of 60 hertz.

Each generator set $G_A$, $G_B$, $G_C$ may include any component or components operable to generate electricity. In some embodiments, each generator set $G_A$, $G_B$, $G_C$ may include an electric generator 28, 30, 32 drivingly connected to an engine 34, 36, 38. Each engine 34, 36, 38 may be any type of device operable to produce mechanical power by combusting fuel, including, but not limited to, a diesel engine, a gasoline engine, a gaseous-fuel-driven engine, and a turbine engine. Each electric generator 28, 30, 32 may be any type of device configured to mechanically receive power from the associated engine 34, 36, 38 and convert at least a portion of that power into electricity, such as an AC induction generator, a permanent-magnet generator, an AC synchronous generator, or a switched-reluctance generator. In some embodiments, each electric generator 28, 30, 32 may have a configuration such that it generates three-phase AC electricity. Additionally, in some embodiments, each generator set $G_A$, $G_B$, $G_C$ may have an electricity-generation capacity less than about five megawatts.

Each generator set $G_A$, $G_B$, $G_C$ may also include various control components. For example, each generator set $G_A$, $G_B$, $G_C$ may have a switch 48, 50, 52 connected between the output of its electric generator 28, 30, 32 and the power-transmission network 16. Each switch 48, 50, 52 may have any configuration that allows selectively electrically connecting the output of the associated electric generator 28, 30, 32 to the power-transmission network 16.

In addition to switches 48, 50, 52, the control components of generator sets $G_A$, $G_B$, $G_C$ may include one or more information-processing devices. For example, generator set $G_A$ may include an associated unit control device 40, generator set $G_B$ may include an associated unit control device 42, and generator set $G_C$ may include an associated unit control device 44. Unit control devices 40, 42, 44 may include various types of information-processing components, including, but not limited to, hardwired control circuits (not shown) and/or microprocessors (not shown). Additionally, in some embodiments, unit control devices 40, 42, 44 may each include an operator interface (not shown) through which an operator may communicate with the unit control device 40, 42, 44. Each generator set $G_A$, $G_B$, $G_C$ may have its unit control device 40, 42, 44 operatively connected to its engine 34, 36, 38, its electric generator 28, 30, 32, and its switch 48, 50, 52. Accordingly, the unit control device 40, 42, 44 of each generator set $G_A$, $G_B$, $G_C$ may monitor and/or control one or more aspects of the operation of the engine 34, 36, 38, the electric generator 28, 30, 32, and the switch 48, 50, 52 of that generator set $G_A$, $G_B$, $G_C$.

Each unit control device 40, 42, 44 may also connect to various components that supply it with information about various other aspects of the operation of power system 10. Each unit control device 40, 42, 44 may receive information about one or more characteristics of the electricity generated by its generator set $G_A$, $G_B$, $G_C$, such as the voltage, current, phase, and/or frequency. Additionally, each unit control device 40, 42, 44 may receive information relating to the amount of power required by electric power load 12. For example, each unit control device 40, 42, 44 may receive information such as the voltage and/or current in one or more portions of power-transmission network 16, the voltage and/or current in one or more components of electric power load 12, and/or the operating states of one or more of the devices of electric power load 12. Unit control devices 40, 42, 44 may also communicate with one another over a communication network 46.

Generator sets $G_A$, $G_B$, $G_C$ are not limited to the configuration shown in FIG. 1. Generator sets $G_A$, $G_B$, $G_C$ may include components other than engines 34, 36, 38 and electric generators 28, 30, 32 for producing electricity. For example, one or more of generator sets $G_A$, $G_B$, $G_C$ may be a fuel cell. Additionally, a generator set $G_A$, $G_B$, $G_C$ may include other types of controls, such as hardwired control circuits, in addition to, or in place of, its unit control device 40, 42, 44.

Power-transmission network 16 may include various electrical components operable to transmit power from power sources 14 to electric power load 12. Power-transmission network 16 may include a power line 54 connected to electric power load 12 and power lines 56, 58, 60 connected to power line 54. Power lines 56, 58, 60 may connect to switches 48, 50, 52, respectively, opposite electric generators 28, 30, 32. Accordingly, closing the switch 48, 50, 52 of a generator set $G_A$, $G_B$, $G_C$ electrically connects the output of its electric generator 28, 30, 32 to power line 54 and electric power load 12 through the power line 56, 58, 60 connected thereto. For supplying electricity from electric utility 20 to power line 54 and electric power load 12, power-transmission network 16 may also include a power line 62 connected to power line 54 and a switch 64 connected between electric utility 20 and power line 62.

Power-system controls 18 may consist of any combination of control components operable to control power system 10 in the manners discussed hereinbelow. In the case of the embodiment shown in FIG. 1, power-system controls 18 may include unit control devices 40, 42, 44, communication network 46, and switches 48, 50, 52, 64. Additionally, power-system controls 18 may include a control device 66. Control device 66 may include any of various types of information-processing components, including, but not limited to, hardwired control circuits (not shown) and/or microprocessors (not shown). Control device 66 may also include an operator interface (not shown) through which an operator may communicate with control device 66. Control device 66 may be operatively connected to switch 64 so that control device 66 may control whether switch 64 electrically connects electric utility 20 to power line 62, power line 54, and electric power load 12. Control device 66 may also connect to communication network 46 so that control device 66 may communicate with unit control devices 40, 42, 44. Accordingly, unit control devices 40, 42, 44, communication network 46, and control device 66 may form a control network 68.

Additionally, control device 66 may connect to various other components that supply it with information about various other aspects of the operation of power system 10. Control device 66 may receive information about one or more characteristics of the electricity supplied by electric utility 20, such as its voltage, current, phase, and/or frequency. Control device 66 may receive similar information about the electricity flowing in power-transmission network 16, the characteristics of which may differ from the characteristics of the electricity supplied by electric utility 20 in circumstances where switch 64 is open. Information about the electricity flowing in power-transmission network 16 and/or other information received by control device 66 may serve as an indication to control device 66 about the power needed by electric power load 12.

Power system 10 is not limited to the configuration shown in FIG. 1. For example, power system 10 may include different numbers and/or types of power sources 14 that can supply power to power-transmission network 16. In some embodiments, power system 10 may omit one or more of generator sets $G_A$, $G_B$, $G_C$ and/or include other generator sets, in addition to generator sets $G_A$, $G_B$, $G_C$. Similarly, power system 10 may not have provisions for connecting electric power load 12 to electric utility 20 and/or power system 10 may have a configuration that allows connecting either electric utility 20 or another electric utility to electric power load 12.

Additionally, power-system controls 18 may have a different configuration than FIG. 1 shows. In some embodiments, power-system controls 18 may omit one or more of unit control devices 40, 42, 44 and control device 66. In such embodiments, power-system controls 18 may perform the control functions of the omitted control device(s) with one or more of the remaining control devices and/or with control devices not shown in FIG. 1. Power-system controls 18 may also include additional components for controlling how power flows within power-transmission network 16. For example, in some embodiments, power-system controls 18 may include one or more switches in power-transmission network 16 for selectively isolating groups of power sources 14, such as groups of generator sets, from electric power load 12.

INDUSTRIAL APPLICABILITY

Power system 10 may have application wherever an electric power load 12 exists. During operation of power system 10, power-system controls 18 may control which of electric utility 20, generator set $G_A$, generator set $G_B$, and generator set $G_C$ supply electricity to electric power load 12 based on operator inputs and/or various operating conditions of power system 10. In some circumstances, power-system controls 18 may maintain switches 48, 50, 52 open to electrically disconnect generator sets $G_A$, $G_B$, $G_C$ from electric power load 12 and simultaneously maintain generator sets $G_A$, $G_B$, $G_C$ shut off. For example, power-system controls 18 may do so in circumstances that warrant supplying the power needs of electric power load 12 exclusively with electricity from electric utility 20 and in circumstances where electric power load 12 does not need electricity.

When power-system controls 18 have generator sets $G_A$, $G_B$, $G_C$ shut off and electrically disconnected from electric power load 12, various events may cause power-system controls 18 to initiate supply of electricity from one or more of generator sets $G_A$, $G_B$, $G_C$ to power line 54 and electric power load 12. For example, if electric utility 20 fails to supply power or fails to supply enough power to meet the power needs of electric power load 12, power-system controls 18 may initiate supply of electricity from one or more of generator sets $G_A$, $G_B$, $G_C$ to power line 54. Additionally, power-system controls 18 may initiate supply of electricity from one or more of generator sets $G_A$, $G_B$, $G_C$ in response to a manual command from an operator or a trigger from an automatic cycle timer. Furthermore, in some circumstances in some embodiments, power-system controls 18 may execute one or more control strategies for automatically managing the amount of power supplied by electric utility 20 versus the amount of power supplied by generator sets $G_A$, $G_B$, $G_C$. In such circumstances, power-system controls 18 may initiate supply of electricity from generator sets $G_A$, $G_B$, $G_C$ in response to certain conditions relating to the amount of power supplied by electric utility 20.

To successfully initiate supply of electricity from one or more of generator sets $G_A$, $G_B$, $G_C$ to power line 54, power-system controls 18 may need to coordinate operation of generator sets $G_A$, $G_B$, $G_C$. To meet this need, one of the control devices of power-system controls 18 may act as a coordinating control unit for the process of initiating supply of power from one or more of generator sets $G_A$, $G_B$, $G_C$. For example, control device 66, unit control device 40, unit control device 42, or unit control device 44 may act as the coordinating control unit. The control device acting as the coordinating control unit may receive information about the operation of each generator set $G_A$, $G_B$, $G_C$ and, based on that information, carry out certain aspects of a master strategy for coordinating operation of generator sets $G_A$, $G_B$, $G_C$.

Figure 2A:
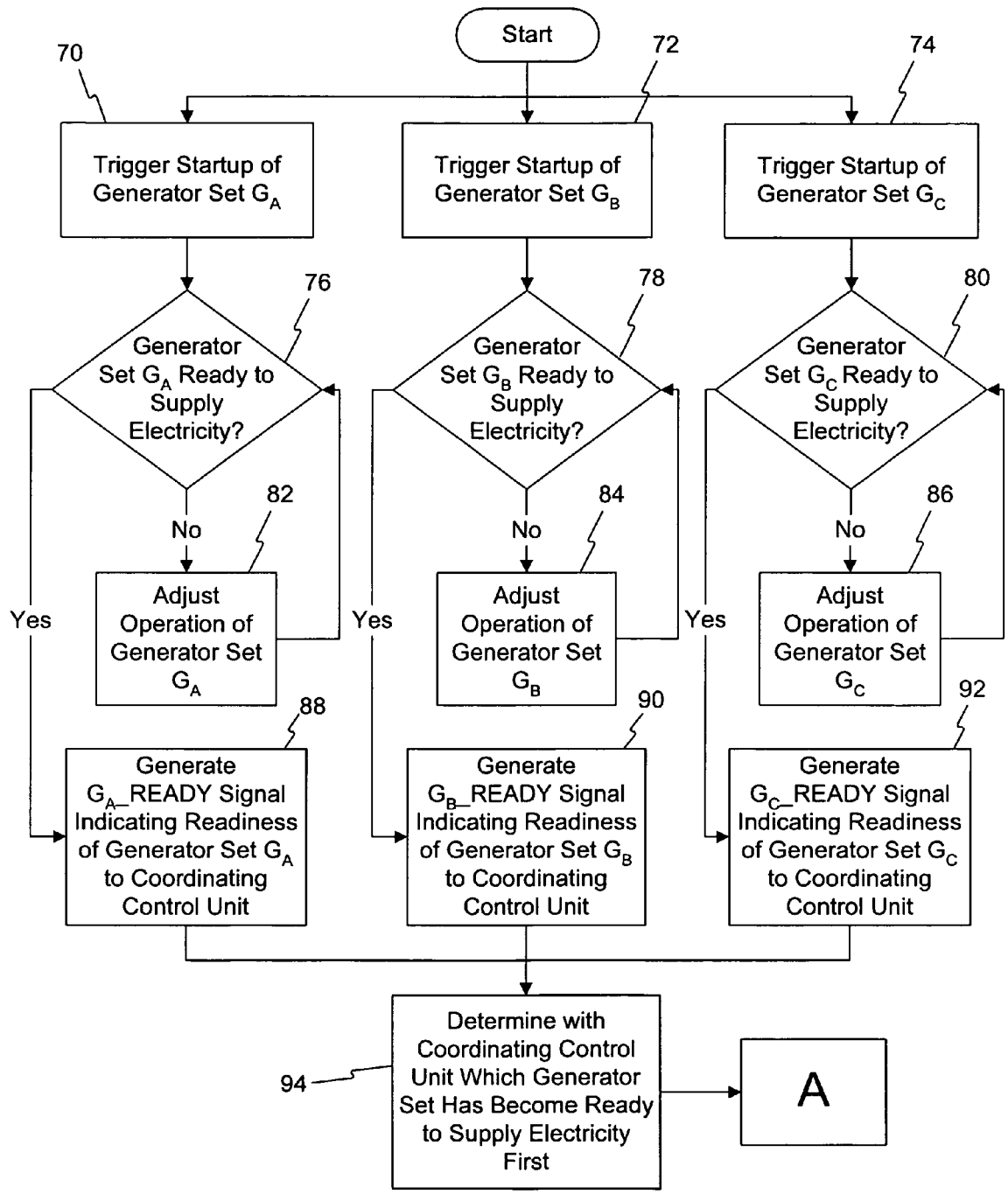
FIG. 2A is a first portion of a flow chart illustrating one embodiment of a method of controlling a power system according to the present disclosure.

Whichever control device acts as the coordinating control unit during startup of generator sets $G_A$, $G_B$, $G_C$ may control certain aspects of the process of initiating supply of electricity from one or more of generator sets $G_A$, $G_B$, $G_C$ to power line 54. FIGS. 2A-2D illustrate one embodiment of a control strategy for initiating supply of electricity from one or more of generator sets $G_A$, $G_B$, $G_C$ with the coordinating control unit executing certain aspects of the process. As FIG. 2A shows, the process may begin with triggering startup of each generator set $G_A$, $G_B$, $G_C$ (steps 70, 72, 74). The control method may rely on any suitable means of triggering startup of generator sets $G_A$, $G_B$, $G_C$, including, but not limited to, the coordinating control unit signaling generator sets $G_A$, $G_B$, $G_C$ to startup, each unit control device 40, 42, 44 automatically triggering startup of the generator set $G_A$, $G_B$, $G_C$ it belongs to, an operator manually triggering startup of generator sets $G_A$, $G_B$, $G_C$, and a cycle timer triggering startup of generator sets $G_A$, $G_B$, $G_C$. The startup process for each generator set $G_A$, $G_B$, $G_C$ may involve, for example, attempting to start its engine 34, 36, 38 and attempting to commence output of voltage from its electric generator 28, 30, 32. In some embodiments, startup of generator sets $G_A$, $G_B$, $G_C$ may be triggered substantially simultaneously.

Subsequently, the unit control device 40, 42, 44 of each generator set $G_A$, $G_B$, $G_C$ may evaluate whether that generator set $G_A$, $G_B$, $G_C$ is ready to supply electricity to power line 54 (steps 76, 78, 80). Unit control devices 40, 42, 44 may use various criteria to decide whether a generator set $G_A$, $G_B$, $G_C$ is ready to supply electricity to power line 54. In some embodiments, a unit control device 40, 42, 44 may consider a generator set $G_A$, $G_B$, $G_C$ ready to supply electricity to power line 54 when its engine speed falls within a target range, the voltage and frequency of the electricity it generates fall within target ranges, and no fault conditions exist. If a generator set $G_A$, $G_B$, $G_C$ is not yet ready to supply electricity to power line 54, its unit control device 40, 42, 44 may adjust its operation (steps 82, 84, 86) until it meets the criteria necessary to consider it ready.

When each generator set $G_A$, $G_B$, $G_C$ becomes ready to supply electricity to power line 54, its unit control device 40, 42, 44 may signal that the generator set $G_A$, $G_B$, $G_C$ is ready. For example, when generator set $G_A$ becomes ready to supply electricity to power line 54, unit control device 40 may generate a $G_A$_READY signal that indicates to the coordinating control unit that generator set $G_A$ is ready (step 88). Similarly, when generator set $G_B$ becomes ready to supply electricity to power line 54, unit control device 42 may generate a $G_B$_READY signal that indicates to the coordinating control unit that generator set $G_B$ is ready (step 90). Likewise, when generator set $G_C$ becomes ready to supply electricity to power line 54, unit control device 44 may generate a $G_C$_READY signal that indicates to the coordinating control unit that generator set $G_C$ is ready (step 92). If a unit control device 40, 42, 44 is acting as the coordinating control unit when it generates one of these "READY" signals, it may transmit the signal internally. A unit control device 40, 42, 44 not acting as the coordinating control unit may transmit such a READY signal to the coordinating control unit through communication lines, such as communication network 46.

After generation of at least one READY signal, the coordinating control unit can determine which generator set $G_A$, $G_B$, $G_C$ first became ready to supply electricity to power line 54 (step 94). The coordinating control unit may do so by determining which generator set $G_A$, $G_B$, $G_C$ is associated with the READY signal that came first. The coordinating control unit may do so without waiting on the second or third READY signals.

Figure 2B:
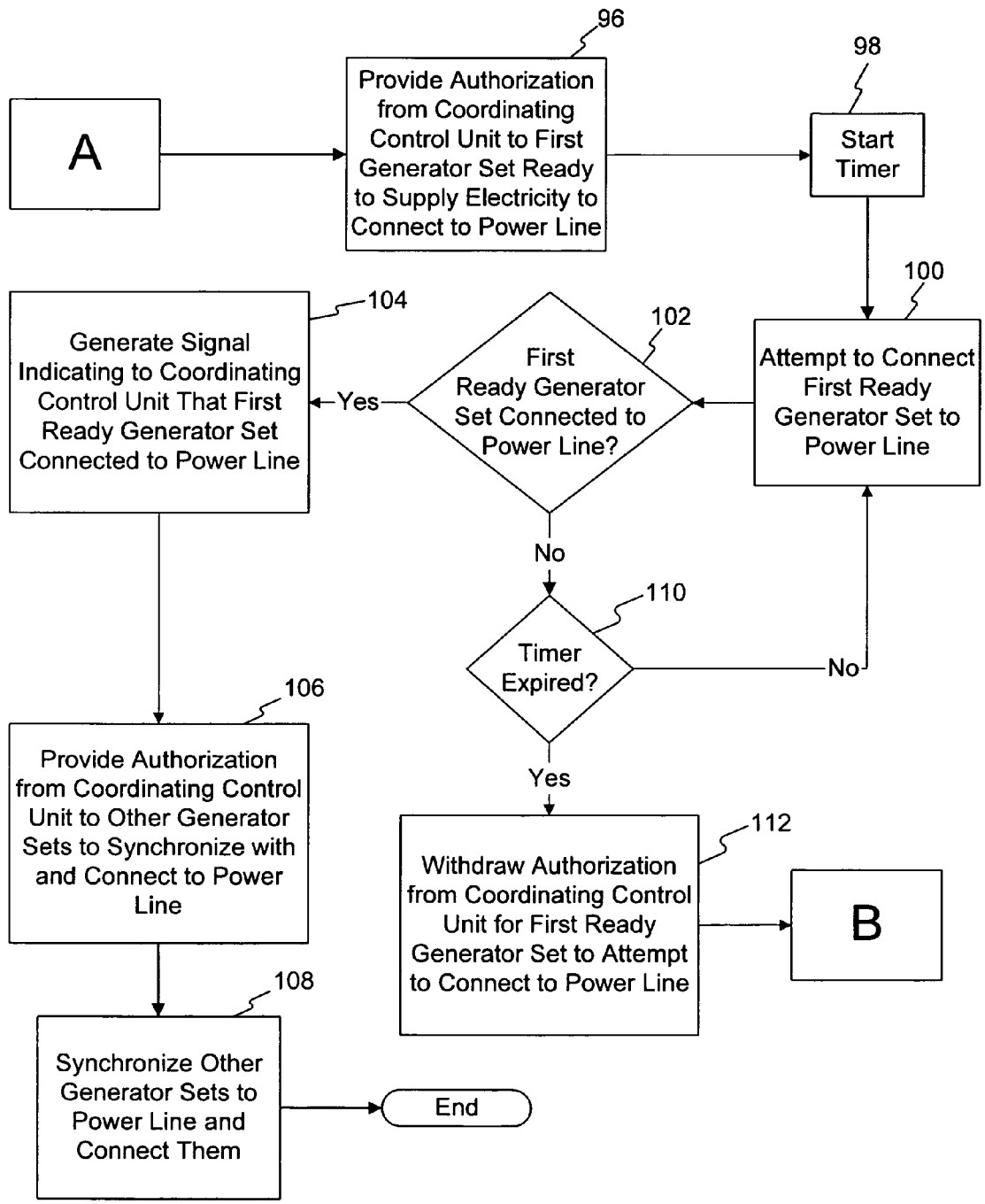
FIG. 2B is a second portion of the flow chart that begins in FIG. 2A.

As FIG. 2B shows, the coordinating control unit may then authorize the generator set $G_A$, $G_B$, $G_C$ that became ready first to attempt to connect to power line 54 (step 96). The coordinating control unit may issue this authorization without waiting for a second one of generator sets $G_A$, $G_B$, $G_C$ to become ready. The coordinating control unit may communicate the authorization, for example, by generating a signal that indicates to the unit control device 40, 42, 44 of the first ready generator set $G_A$, $G_B$, $G_C$ that it has authorization to attempt to connect to power line 54. If the coordinating control unit is the unit control device 40, 42, 44 of the generator set $G_A$, $G_B$, $G_C$ that became ready first, it may transmit this signal internally. Otherwise, the coordinating control unit may transmit the signal over communication lines, such as communication network 46. After generating a signal authorizing the first ready generator set $G_A$, $G_B$, $G_C$ to attempt to connect to power line 54, the coordinating control unit may start a timer to keep track of the amount of time expired since the authorization (step 98).

The authorized generator set $G_A$, $G_B$, $G_C$ may then respond by attempting to connect to power line 54 (step 100). For example, the unit control device 40, 42, 44 of the authorized generator set $G_A$, $G_B$, $G_C$ may attempt to close the associated switch 48, 50, 52. Upon receiving authorization from the coordinating control unit to attempt to connect to power line 54, a generator set $G_A$, $G_B$, $G_C$ may do so without waiting for any further information from the coordinating control unit or other components of power system 10.

If the authorized generator set $G_A$, $G_B$, $G_C$ successfully connects to power line 54 (step 102), its unit control device 40, 42, 44 may generate a signal indicating to the coordinating control unit that the generator set $G_A$, $G_B$, $G_C$ has successfully connected (step 104). In response, the coordinating control unit may authorize the other generator sets $G_A$, $G_B$, $G_C$ to connect to power line 54 once they have substantially synchronized with the electricity in power line 54 (step 106). Under the control of their coordinating control units 40, 42, 44, those generator sets $G_A$, $G_B$, $G_C$ not yet connected to power line 54 may then substantially synchronize with the electricity in power line 54 and connect thereto (step 108).

Figure 2C:
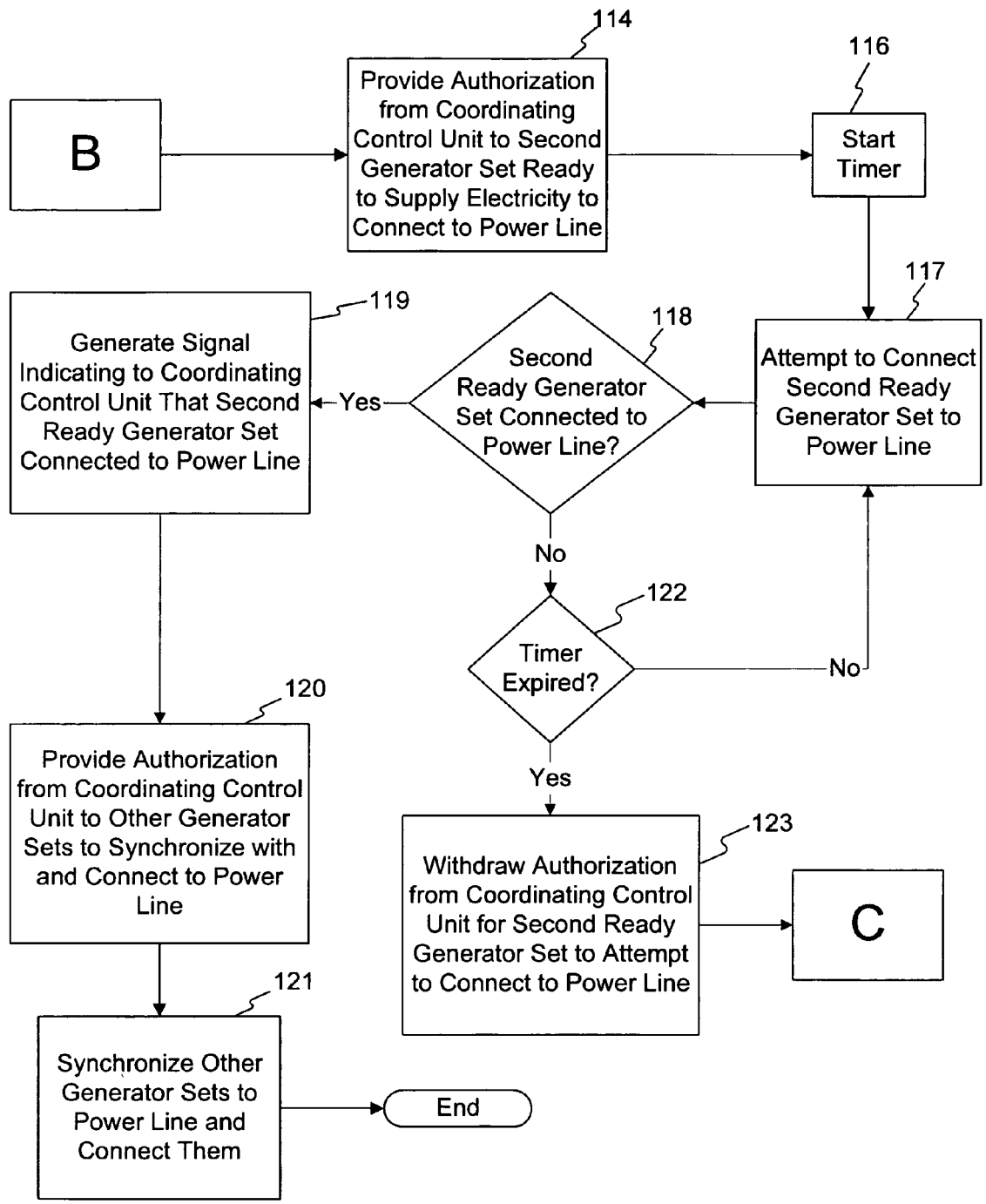
FIG. 2C is a third portion of the flow chart that begins in FIG. 2A.
Figure 2D:
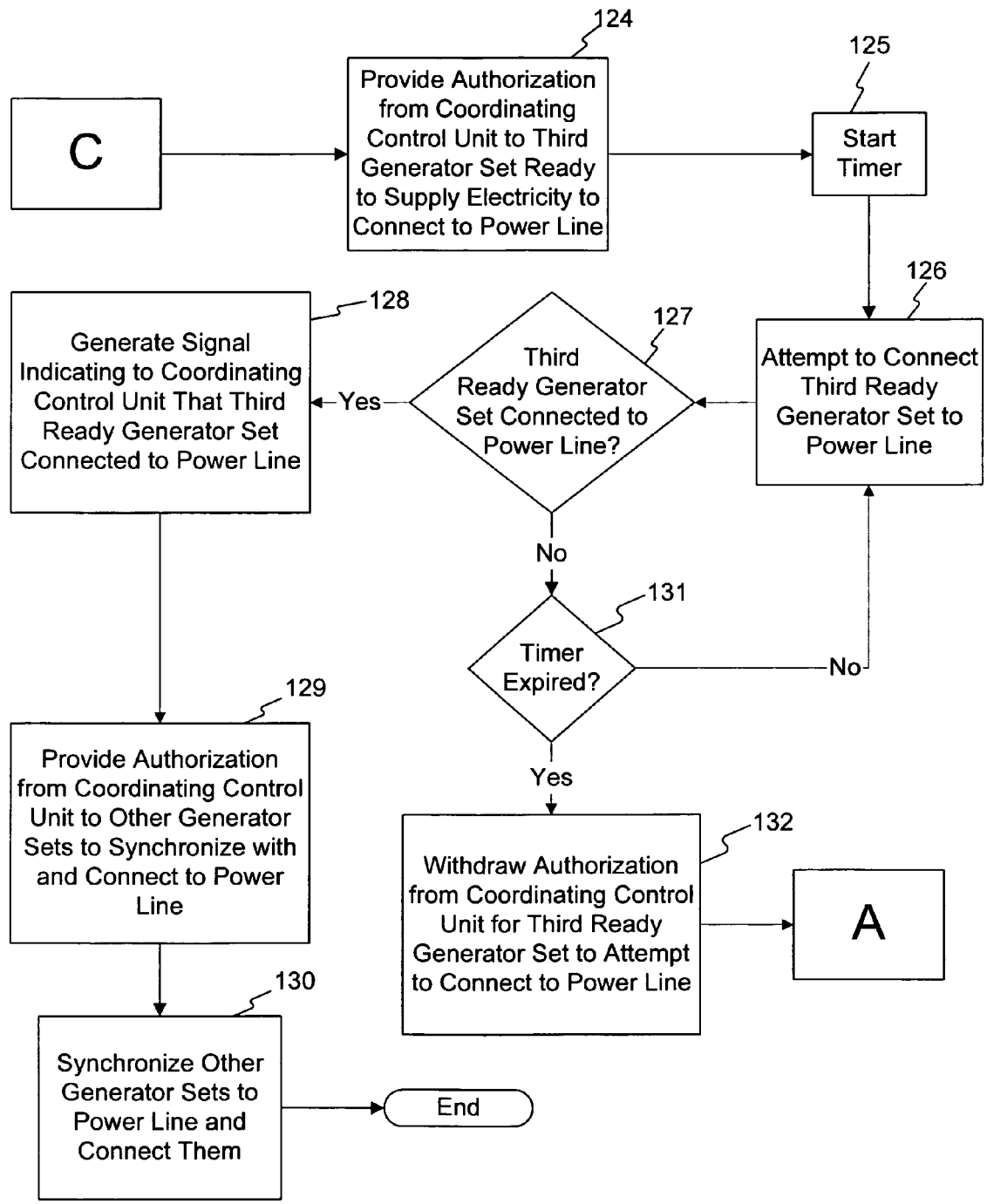
FIG. 2D is a fourth portion of the flow chart that begins in FIG. 2A.

If the generator set $G_A$, $G_B$, $G_C$ that receives first authorization to attempt to connect does not initially succeed in connecting (step 102), it may continue trying until the timer has expired (step 110). Various types of component failures, such as failure of communication lines and/or failure of a switch 48, 50, 52, could prevent a generator set $G_A$, $G_B$, $G_C$ from successfully connecting to power line 54. If the timer expires without the first ready generator set $G_A$, $G_B$, $G_C$ successfully connecting to power line 54, the coordinating control unit may withdraw authorization for the first ready generator set $G_A$, $G_B$, $G_C$ to attempt to connect to power line 54 (step 112). As FIG. 2C shows, the coordinating control unit may then authorize another generator set $G_A$, $G_B$, $G_C$ that has become ready to supply electricity to attempt to connect to power line 54 (step 114). As FIGS. 2C and 2D show, power-system controls 18 may then use the same basic process to attempt to connect the second ready generator set $G_A$, $G_B$, $G_C$ and bring the other generator sets $G_A$, $G_B$, $G_C$ online (steps 116-123) and, if that fails, to attempt to connect the third ready generator set $G_A$, $G_B$, $G_C$ and bring the other generator sets $G_A$, $G_B$, $G_C$ online (steps 124-132).

If the second and third ready generator sets $G_A$, $G_B$, $G_C$ fail to connect, power-system controls 18 may again attempt to connect the first ready generator set $G_A$, $G_B$, $G_C$ (step 96, FIG. 2A). This process may continue until power-system controls successfully initiate supply of electricity to power line 54 with one of generator sets $G_A$, $G_B$, $G_C$ or some other power source 14, such as electricity utility initiates supply of electricity to power line 54. If, at any time during the process shown in FIGS. 2A-2D, another power source 14 initiates supply of electricity to power line 54 before one of generator sets $G_A$, $G_B$, $G_C$ has successfully connected to power line 54, power-system controls 18 may exit the process shown in FIGS. 2A-2D. In such an event, if circumstances still warrant supplying electricity to power line 54 with one or more of generator sets $G_A$, $G_B$, $G_C$ power-system controls 18 may substantially synchronize those generator sets $G_A$, $G_B$, $G_C$ with the electricity in power line 54 and connect them to power line 54.

After power-system controls 18 have successfully initiated supply of electricity from one or more of generator sets $G_A$, $G_B$, $G_C$ to power line 54, the coordinating control unit may serve to coordinate additional aspects of the operation of generator sets $G_A$, $G_B$, $G_C$. For example, the coordinating control unit may control the aggregate amount of electricity supplied to power line 54 by generator sets $G_A$, $G_B$, $G_C$ and the individual contribution of each generator set $G_A$, $G_B$, $G_C$ to that aggregate amount. The coordinating control unit may do so by indicating to each unit control device 40, 42, 44 whether the associated generator set $G_A$, $G_B$, $G_C$ should supply electricity to power line 54 and, if so, how much electricity. The coordinating control unit may determine how much electricity each generator set $G_A$, $G_B$, $G_C$ should supply based on operator inputs and/or various types of automatic power-management strategies.

In some embodiments, at this stage of operation, the coordinating control unit's strategy for selecting which generator sets $G_A$, $G_B$, $G_C$ supply electricity may focus on effectively and efficiently meeting the power requirements of electric power load 12. In doing so, the coordinating control unit may base the determination of which generator sets $G_A$, $G_B$, $G_C$ supply electricity on various factors relating to the amount of power supplied by different power sources 14, the power capacity of different power sources 14, and/or the amount of power required by electric power load 12. For example, if the power output of one or more of the generator sets $G_A$, $G_B$, $G_C$ currently supplying electricity exceeds a reference value, the coordinating control unit may elect for one or more additional generator sets $G_A$, $G_B$, $G_C$ to commence supplying electricity. Similarly, if the power output of one or more of the generator sets $G_A$, $G_B$, $G_C$ currently supplying electricity falls below a reference value, the coordinating control unit may elect for one or more of those generator sets $G_A$, $G_B$, $G_C$ to discontinue supplying electricity.

Additionally, in some embodiments, the coordinating control unit may in some circumstances elect for one or more of generator sets $G_A$, $G_B$, $G_C$ to discontinue supplying electricity and for one or more others of generator sets $G_A$, $G_B$, $G_C$ to commence supplying electricity instead. For example, the coordinating control unit may do so in circumstances where a generator set $G_A$, $G_B$, $G_C$ not currently supplying power can more efficiently contribute to meeting the power requirements of electric power load 12 than one or more generator sets $G_A$, $G_B$, $G_C$ currently supplying electricity. Various circumstances may allow one of generator sets $G_A$, $G_B$, $G_C$ not currently supplying electricity to more efficiently contribute to the power needs of electric power load 12 than one or more generator sets $G_A$, $G_B$, $G_C$ currently supplying electricity. For example, in some cases, a generator set $G_A$, $G_B$, $G_C$ not currently supplying power may have a power capacity better suited to meeting the current power needs than the power capacity of one or more of the generator sets $G_A$, $G_B$, $G_C$ currently supplying power.

The coordinating control unit may change which generator sets $G_A$, $G_B$, $G_C$ supply electricity at various times. As mentioned above, once at least one of generator sets $G_A$, $G_B$, $G_C$ has begun supplying electricity to power line 54, the focus of the strategy used to select generator sets $G_A$, $G_B$, $G_C$ may shift from quickly initiating supply of electricity to advancing one or more other objectives. Accordingly, the coordinating control unit may change which of generator sets $G_A$, $G_B$, $G_C$ supply electricity in the period directly following one or more of generator sets $G_A$, $G_B$, $G_C$ beginning supply of electricity to power line 54. Thereafter, the coordinating control unit may change which of generator sets $G_A$, $G_B$, $G_C$ supply electricity in response to changing operating conditions or as a result of additional changes in control strategy.

Power-system controls 18 may use various logistical approaches to carry into effect the determinations made by the coordinating control unit regarding which of generator sets $G_A$, $G_B$, $G_C$ supply electricity and how much electricity they each supply. For example, the coordinating control unit may control whether and how much one or more of generator sets $G_A$, $G_B$, $G_C$ contribute by sending signals to their unit control devices 40, 42, 44 indicating whether the generator sets $G_A$, $G_B$, $G_C$ they belong to should supply electricity and, if so, how much. Those other unit control devices 40, 42, 44 may then carry into effect these commands from the coordinating control unit. In circumstances where one of unit control devices 40, 42, 44 acts as the coordinating control unit, it can directly control whether the generator set $G_A$, $G_B$, $G_C$ it belongs to supplies electricity and, if so, how much.

Various factors may affect which control device acts as the coordinating control unit for generator sets $G_A$, $G_B$, $G_C$. For example, operator inputs and/or operating conditions of power system 10 may determine which of control devices 40, 42, 44, 66 acts as the coordinating control unit. In some embodiments, control network 68 may have control devices 40, 42, 44, 66 ranked according to the priority that each has to operate as the coordinating control unit. For example, control network 68 may have control device 66 ranked as having the highest priority to act as the coordinating control unit, unit control device 40 ranked as having the second highest priority to act as the coordinating control unit, unit control device 42 ranked as having the third highest priority to act as the coordinating control unit, and unit control device 44 ranked as having the fourth highest priority to act as the coordinating control unit.

In some embodiments, control network 68 may have a configuration that allows an operator to set and reset the ranking of the relative priority that each control device 40, 42, 44, 66 has to operate as the coordinating control unit for generator sets $G_A$, $G_B$, $G_C$. For example, a control device 40, 42, 44, 66 may have provisions for allowing an operator to input a desired priority ranking for that control device 40, 42, 44, 66 and, in some cases, a desired priority ranking for one or more other control devices 40, 42, 44, 66. In some embodiments, control network 68 may keep track of which control devices 40, 42, 44, 66 have what priority ranking through communication between control devices 40, 42, 44, 66 over communication network 46.

In some embodiments, control network 68 may automatically control which control device 40, 42, 44, 66 acts as the coordinating control unit. For example, control network 68 may do so in embodiments where control network 68 has control devices 40, 42, 44, 66 ranked according to the priority each has to operate as the coordinating control unit. In such embodiments, control network 68 may, at various times, operate with one or more of control devices 40, 42, 44, 66 shutdown and, therefore, unable to operate as the coordinating control unit. In such circumstances, whichever of the currently active control devices 40, 42, 44, 66 has the highest priority to act as the coordinating control unit may do so. For example, if the currently active control devices 40, 42, 44, 66 include the control device 40, 42, 44, 66 with the second highest priority and the control device with the fourth highest priority, the control device 40, 42, 44, 66 with the second highest priority may act as the coordinating control unit. To enable control network 68 to operate in this manner, each control device 40, 42, 44, 66 may send signals over communication network 46 indicating when it is active and, thus, capable of operating as the coordinating control unit.

If a control device 40, 42, 44, 66 becomes active that has a higher priority to act as the coordinating control unit than the control device 40, 42, 44, 66 currently acting as the coordinating control unit, control network 68 may automatically transfer the role of coordinating control unit to the control device 40, 42, 44, 66 with the higher priority. For example, if the control device 40, 42, 44, 66 with the second highest priority to act as the coordinating control unit is operating as the coordinating control unit and the control device 40, 42, 44, 66 with the highest priority becomes active, control network 68 may transfer the role of coordinating control unit to the control device 40, 42, 44, 66 with the highest priority.

Control network 68 may also transfer the role of coordinating control unit in response to inputs from an operator. For example, if an operator commands control network 68 to transfer the role of coordinating control unit to a particular one of control devices 40, 42, 44, 66, control network 68 may do so. Additionally, if an operator requests shutdown of the control device 40, 42, 44, 66 acting as the coordinating control unit, control network 68 may transfer the role of coordinating control unit to another control device 40, 42, 44, 66. If the operator does not specify which control device 40, 42, 44, 66 should take over the role of coordinating control unit, control network 68 may automatically select which control device 40, 42, 44, 66 will take over the role. For example, control network 68 may automatically transfer the role to the control device 40, 42, 44, 66 with the next highest priority to act as the coordinating control unit. Conversely, if the operator designates which control device 40, 42, 44, 66 should take over the role of coordinating control unit, control network 68 may transfer the role of coordinating control unit to that control device 40, 42, 44, 66.

Control network 68 may use various logistical approaches to transfer the role of coordinating control unit from one control device 40, 42, 44, 66 to another. In some embodiments, the control device 40, 42, 44, 66 may unilaterally control whether the role of coordinating control unit transfers to another control device 40, 42, 44, 66. To enable this, the control device 40, 42, 44, 66 may receive any inputs necessary to determine whether to transfer the role of coordinating control unit, such as inputs regarding which control devices are active and information about any manual commands from an operator that warrant a transfer. When circumstances warrant a transfer, the control device 40, 42, 44, 66 currently acting as the coordinating control unit may signal the appropriate control device 40, 42, 44, 66 to take over the role of coordinating control unit. The control device 40, 42, 44, 66 signaled to take over the role of coordinating control unit may then signal back acknowledging that it will take over the role.

Operation of power system 10 is not limited to the examples discussed above. For example, power-system controls 18 may apply the principles of the control methods discussed above to control fewer or more generator sets.

Additionally, power-system controls 18 may perform one or more of the actions discussed above in different orders, perform one or more of the actions discussed above with different components, perform one or more of the actions discussed above in different manners, omit one or more of the actions discussed above, and/or perform actions not discussed above. For example, in some cases, only a subset of generator sets $G_A$, $G_B$, $G_C$ may get triggered to startup at the beginning of the process of initiating supply of electricity from one or more of the generator sets $G_A$, $G_B$, $G_C$. Additionally, rather than unit control devices 40, 42, 44 individually determining when each generator set $G_A$, $G_B$, $G_C$ becomes ready to supply electricity, the coordinating control unit may receive basic information about the operation of each generator set $G_A$, $G_B$, $G_C$ and determine when it becomes ready to supply electricity. Similarly, power-system controls 18 may use additional and/or different criteria than mentioned above to determine when a generator set $G_A$, $G_B$, $G_C$ has become ready to supply electricity. The logistical approach for transferring the role of coordinating control unit from one control device to another may also differ from the examples discussed above.

Additionally, details relating to which control device 40, 42, 44, 66 serves as the coordinating control unit in various circumstances may differ from the examples provided above. For example, in various embodiments and/or circumstances, control devices 40, 42, 44, 66 may have different relative priorities to act as the coordinating control unit than mentioned above. In some embodiments, one of unit control devices 40, 42, 44, 66 may have the highest priority to act as the coordinating control unit. This may occur in embodiments where control network 68 omits control device 66 and includes only unit control devices 40, 42, 44, as well as in embodiments where control network includes control device 66 and/or other control devices in addition to unit control devices 40, 42, 44. Additionally, control network 68 may use additional and/or different criteria than a priority ranking to determine which control device 40, 42, 44, 66 acts as the coordinating control unit. As a result, power-system controls 18 may also transfer the role of coordinating control unit in additional and/or different circumstances than mentioned above.

Furthermore, in some embodiments, power-system controls 18 may have one control device permanently designated as the coordinating control unit for generator sets $G_A$, $G_B$, $G_C$. In such embodiments, the control device permanently serving as the coordinating control unit for generator sets $G_A$, $G_B$, $G_C$ may be one of unit control devices 40, 42, 44, control device 66, or some other control device, such as a control device dedicated to the purpose of coordinating operation of generator sets $G_A$, $G_B$, $G_C$.

Additionally, in some embodiments, power-system controls 18 may operate with no control device acting as a coordinating control unit for generator sets $G_A$, $G_B$, $G_C$ prior to the first generator set $G_A$, $G_B$, $G_C$ becoming ready to supply electricity. In such an embodiment, when a generator set $G_A$, $G_B$, $G_C$ becomes ready to supply electricity, its unit control device 40, 42, 44 may send a signal to the other unit control devices 40, 42, 44 indicating that the generator set $G_A$, $G_B$, $G_C$ has become ready to supply electricity. The unit control device 40, 42, 44 of the generator set $G_A$, $G_B$, $G_C$ that first becomes ready to supply electricity may assume the role of coordinating control unit, and attempt to connect its generator set $G_A$, $G_B$, $G_C$ to power line 54. In the event that two or more generator sets $G_A$, $G_B$, $G_C$ simultaneously become ready to supply electricity, power-system controls 18 may use a predetermined priority ranking of generator sets $G_A$, $G_B$, $G_C$ to determine which of the generator sets $G_A$, $G_B$, $G_C$ ready to supply electricity first will attempt to connect to power line 54 first.

Furthermore, operation of power system 10 after one or more of generator sets $G_A$, $G_B$, $G_C$ begin supplying electricity to power line 54 may differ in some respects from the examples provided above. For example, the coordinating control unit may use additional and/or different criteria than discussed above to select which generator sets $G_A$, $G_B$, $G_C$ supply electricity. Additionally, power-system controls 18 may use different logistical approaches to implement the determinations made by the coordinating control unit regarding which of generator sets $G_A$, $G_B$, $G_C$ supply electricity and how much each one supplies.

The disclosed embodiments may provide certain performance advantages. Supplying the coordinating control unit with information that it can use to affirmatively determine when each generator set $G_A$, $G_B$, $G_C$ has become ready to supply electricity allows the coordinating control unit to unilaterally coordinate attempts to connect generator sets $G_A$, $G_B$, $G_C$ to power line 54. This approach eliminates the possibility of a control device other than the coordinating control unit triggering an attempt to connect a generator set $G_A$, $G_B$, $G_C$ to power line 54. Accordingly, when the coordinating control unit determines which generator set $G_A$, $G_B$, $G_C$ has first become ready to supply electricity, it can set in motion an attempt to connect that generator set $G_A$, $G_B$, $G_C$ to power line 54 without waiting for information about the operation of other generator sets $G_A$, $G_B$, $G_C$. By doing so, the coordinating control unit may initiate supply of electricity to power line 54 as quickly as logistically possible.

Additionally, using a unit control device 40, 42, 44 of one of the generator sets $G_A$, $G_B$, $G_C$ as the coordinating control unit may provide certain advantages. For example, doing so may obviate the need for a separate control device dedicated to coordinating control of generator sets $G_A$, $G_B$, $G_C$, thereby allowing reduced component cost and complexity of power system 10. In concert with this, the ability to transfer the role of coordinating control unit from one control device 40, 42, 44, 66 to another may allow freely selecting which control devices 40, 42, 44, 66 are active at any given time.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A method of operating a power system, the power system having a plurality of generator sets and a power line, the method comprising:
   triggering startup of a plurality of the generator sets that are disconnected from the power line;
   supplying to a control device acting as a coordinating control unit information about the operating state of each of the plurality of generator sets triggered to start up;

determining with the coordinating control unit which of the plurality of generator sets has become ready to supply electricity to the power line first; and supplying electricity to the power line by first connecting to the power line the generator set that the coordinating control unit has determined to be the first ready to supply electricity.

2. The method of claim 1, wherein connecting to the power line the generator set that the coordinating control unit has determined to be the first ready to supply electricity includes attempting to connect this generator set to the power line without waiting to determine when the other generator sets become ready to supply electricity.

3. The method of claim 1, further including selectively transferring the role of coordinating control unit from one control device of the power system to another control device of the power system.

4. The method of claim 1, wherein connecting to the power line the generator set that the coordinating control unit has determined to be the first ready to supply electricity includes generating a signal with the coordinating control unit that triggers this generator set to connect to the power line.

5. The method of claim 1, wherein:
the power system includes a control network with a plurality of unit control devices, each unit control device being associated with a particular one of the plurality of generator sets; and
the control device acting as the coordinating control unit is one of the unit control devices.

6. The method of claim 5, further including, after initiating supply of electricity to the power line, coordinating control of one or more additional aspects of the operation of the plurality of generator sets with the coordinating control unit.

7. The method of claim 1, further including, after initiating supply of electricity to the power line, controlling which of the plurality of generator sets supply electricity to the power line with the coordinating control unit based at least in part on information related to power needs of a power load connected to the power line.

8. A method of operating a power system, the power system having a power line and a plurality of generator sets, the method comprising:
with the plurality of generator sets disconnected from the power line, triggering startup of a plurality of the generator sets; and
in response to each generator set becoming ready to supply electricity, generating a signal that indicates the readiness of the generator set to a control device acting as a coordinating control unit, and
operating the coordinating control unit to control which of the generator sets commanded to start up will first connect to the power line, including, in response to the first signal indicating the readiness of a generator set, providing the generator set associated with the first signal first authorization from the coordinating control unit to connect to the power line.

9. The method of claim 8, further including, if the generator set provided first authorization to connect to the power line fails to connect to the power line within a predetermined time, providing another generator set with authorization from the coordinating control unit to connect to the power line.

10. The method of claim 8, wherein:
the power system includes a control network with a plurality of unit control devices, each unit control device being associated with a particular one of the generator sets; and the control device acting as the coordinating control unit is one of the unit control devices.

11. The method of claim 8, wherein:
the power system includes a plurality of control devices capable of operating as the coordinating control unit; and
the method further includes, selectively transferring the role of coordinating control unit from one control device to another.

12. The method of claim 10, further including, after the generator set first authorized to connect to the power line connects to the power line, coordinating one or more additional aspects of the operation of the plurality of generator sets with the coordinating control unit.

13. The method of claim 10, further including, after the generator set first authorized to connect to the power line connects to the power line, if it is desired to discontinue supplying electricity with the generator set associated with the unit control device acting as the coordinating control unit, transferring the role of coordinating control unit to another control device of the power system before discontinuing supplying electricity with that generator set.

14. A power system, comprising:
a power line;
a plurality of generator sets operable to supply electricity to the electric power load; and
a control network that includes a plurality of control devices, the control network being configured to
operate with one of the plurality of control devices acting as a coordinating control unit to coordinate one or more aspects of the operation of the plurality of generator sets, and
selectively change which of the control devices acts as the coordinating control unit.

15. The power system of claim 14, wherein:
the plurality of control devices includes a first unit control device belonging to a first one of the generator sets;
operating with one of the control devices acting as the coordinating control unit includes operating with the first unit control device acting as the coordinating control unit in at least some circumstances.

16. The power system of claim 14, wherein selectively changing which of the control devices acts as the coordinating control unit includes transferring the role of coordinating unit to another control device if an operator requests that the control device acting as the coordinating control unit shut down.

17. The power system of claim 14, wherein:
the control network has a plurality of the control devices ranked according to the relative priority each has to act as the coordinating control unit; and
selectively changing which of the plurality of control devices acts as the coordinating control unit includes transferring the role of coordinating control unit if a control device becomes active that has a higher priority to act as the coordinating control unit than the control device currently acting as the coordinating control unit.

18. The power system of claim 14, wherein transferring the role of coordinating control unit if a control device becomes active that has a higher priority to act as the coordinating control unit than the control device currently acting as the coordinating control unit includes the control device currently acting as the coordinating control unit sending a signal to the control device with the higher priority authorizing the control device with the higher priority to take over the role of coordinating control unit.

19. The power system of claim 14, wherein the coordinating control unit controls which of the plurality of generator sets connects to the power line first in circumstances where no electricity is flowing in the power line.

20. The power system of claim 14, wherein, in at least some circumstances, the coordinating control unit controls which of the generator sets supply electricity to the power line based at least in part on one or more parameters related to the amount of power required by one or more electric power loads connected to the power line.

* * * * *